(12) United States Patent  
Kikushima

(10) Patent No.: US 8,225,141 B2
(45) Date of Patent: Jul. 17, 2012

(54) INFORMATION PROCESSING APPARATUS, PROCESS VERIFICATION SUPPORT METHOD, AND COMPUTER PRODUCT

(75) Inventor: Kaoru Kikushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/851,735

(22) Filed: Aug. 6, 2010

(65) Prior Publication Data

US 2010/0325494 A1 Dec. 23, 2010

Related U.S. Application Data

(63) Continuation of application No. PCT/JP2008/053072, filed on Feb. 22, 2008.

(51) Int. Cl.
*G06F 11/00* (2006.01)
(52) U.S. Cl. .................................................. 714/38.11
(58) Field of Classification Search ................ 714/38.1, 714/38.11, 38.13, 48
See application file for complete search history.

(56) References Cited

U.S. PATENT DOCUMENTS

| | | | | |
|---|---|---|---|---|
| 7,376,864 B1* | 5/2008 | Hu et al. | | 714/6.13 |
| 7,594,143 B2* | 9/2009 | Chin et al. | | 714/38.11 |
| 7,607,051 B2* | 10/2009 | Koike | | 714/55 |
| 7,673,180 B1* | 3/2010 | Chen et al. | | 714/38.11 |
| 7,698,598 B1* | 4/2010 | Harris | | 714/37 |
| 2002/0046364 A1* | 4/2002 | Yoshimura | | 714/38 |
| 2003/0237035 A1* | 12/2003 | Bowers et al. | | 714/724 |
| 2005/0015672 A1* | 1/2005 | Yamada | | 714/38 |
| 2008/0270839 A1* | 10/2008 | Ho et al. | | 714/38 |

FOREIGN PATENT DOCUMENTS

| | | |
|---|---|---|
| JP | 5-252237 | 9/1993 |
| JP | 05-313918 | 11/1993 |
| JP | 09-325903 | 12/1997 |
| JP | 2836683 | 10/1998 |
| JP | 2001-282584 | 10/2001 |
| JP | 2007-265137 | 10/2007 |

OTHER PUBLICATIONS

International Search Report issued May 13, 2008, in Int'l. App. No. PCT/JP2008/053072.
International Preliminary Report on Patentability mailed Sep. 2, 2010 in Int'l. App. No. PCT/JP2008/053072.
International Preliminary Report on Patentability mailed Oct. 14, 2010 in Intl. App. No. PCT/JP2008/053072.

* cited by examiner

*Primary Examiner* — Marc Duncan
(74) *Attorney, Agent, or Firm* — Greer Burns & Crain, Ltd.

(57) ABSTRACT

An information processing apparatus includes a detecting unit configured to detect an abort signal among signals from a kernel that monitors execution of a process by referring to details concerning the execution; an obtaining unit configured to obtain information that concerns the details concerning the execution of the process and is referred to by the kernel at a detection of the abort signal by the detecting unit; and a storing unit configured to store the information obtained by the obtaining unit into a memory.

18 Claims, 9 Drawing Sheets

FIG.8

```
800
Time: Wed Oct 10 16:26:00 JST 2007
Signal: 6
Sender: 18716
Command: kill -ABRT 18904
Stack Trace:
  kill (4ac98, 6, 49c00, 31, 44400, 0) +8
  dokill (4ac90, 4b0b0, 5, 4ac98, 0, 6) +0x20c
  execute (4b0b0, 4b0b0, 1809, 4b0b0, 0, 2000) +0xa78
  execute (0, 0, 4b0b0, 0, 0, 4b100) +0xcd0
  process (0, 47800, 47800, 0, 48c00, 2) +0x360
  main (48c00, 0, 0, 49c00, 48c00, 0) +0xe94
  _start (0, 0, 0, 0, 0, 0) +0x108
Process Tree:
  217   /usr/sbin/inetd -s
    18070 in.telnetd
      18080 -csh
Receiver: 18904
```

INFORMATION PROCESSING APPARATUS, PROCESS VERIFICATION SUPPORT METHOD, AND COMPUTER PRODUCT

CROSS REFERENCE TO THE RELATED APPLICATIONS

This application is a continuation application of International Application PCT/JP2008/053072, filed on Feb. 22, 2008, and designating the U.S., the entire contents of which are incorporated herein by reference.

FIELD

The embodiments discussed herein are related to the verification of details concerning the execution of a process that has been aborted (forcibly terminated).

BACKGROUND

Conventionally, an information processing apparatus has to be equipped with software including basic functions of an operating system (OS) such as a kernel, to execute an application prepared by a user (hereinafter, "user application"). The kernel includes various main functions such as monitoring user application(s) and/or peripheral devices, managing resources such as disks and memories, interrupt processing, inter-process communications, etc.

A group of given operations executed by the information processing apparatus described above is generally called a process, and several processes are executed in series or in parallel under the control of the kernel. During the execution of a process, the kernel continuously monitors details concerning the execution of the process and aborts the process if a given event such as an interrupt and an error occurs.

The abort is described with reference to FIGS. 10 and 11. FIG. 10 is a flowchart of an abort signal transmission process executed by the kernel. FIG. 11 is a flowchart of an abort signal reception process executed by the application.

As depicted in the flowchart of FIG. 10, the kernel determines whether an event causing an abort has occurred (step S1001). The kernel awaits the occurrence of an event (step S1001: NO), and upon the occurrence of an event (step S1001: YES), executes an abort signal transmission process (step S1002). Then a signal transmission operation is executed (step S1003), and the operations of the kernel end.

The application, on the other hand, determines whether a signal from the kernel has been delivered (step S1101). The application awaits delivery of the signal (step S1101: NO). Upon delivery of the signal (step S1101: YES), a signal reception operation is executed (step S1102). Then, the application executes a reception process related to abort (step S1103). Through the procedure described above, the operations of the application end (see, for example, Japanese Patent No. 2836683).

As described in FIGS. 10 and 11, the abort signal is sent via the kernel. However, information concerning the sender of the signal (here, the kernel) is not communicated to the process of the recipient of the signal (here, the application). Furthermore, the executor of the process that has received the signal (here, the user of the information processing apparatus) does not have any means to search for the information concerning the sender of the received signal.

For example, in Solaris (a typical UNIX-like OS), information passed on to the signal reception operation during the signal transmission operation is limited to the following 4 items: (1) pointer information concerning the reception process; (2) pointer information concerning the receiving kernel thread; (3) information concerning the signal number; and (4) flag information indicating whether the source of the signal is the user or the kernel.

As a means to collect information concerning the sender of the signal, Solaris can be equipped with Audit (audit) and/or DTrace (dynamic trace) for use in the signal transmission operation (step S1003) described in FIG. 10. However, these two functions are set on the assumption that the same problem will occur again. Thus, if the problem does not reoccur, no information for investigation can be collected. Further, setting the functions requires some skill.

Furthermore, the impact of Audit and/or DTrace on system performance should be considered. In particular, Audit is likely to increase the load on the system since Audit obtains all information of a specified pointer. Furthermore, the information that can be collected by Audit and/or DTrace is for the entire system and for a system manager. Thus, even if a user executing the aborted process obtains the information, it is difficult for the user to investigate the cause of the abort. In other words, it is difficult for ordinary users to identify the cause of the abort.

Nonetheless, there are many cases in which a process is aborted due to reception of an unexpected signal, and thus the sender of the signal causing the abort needs to be investigated. However, the cause cannot be investigated due to the absence of the information concerning the sender of the signal. Currently, the user has no countermeasure other than setting Audit and waiting for a reoccurrence of the problem. As a result, in many cases the cause remains unidentified.

SUMMARY

According to an aspect of an embodiment, an information processing apparatus includes a detecting unit configured to detect an abort signal among signals from a kernel that monitors execution of a process by referring to details concerning the execution; an obtaining unit configured to obtain information that concerns the details concerning the execution of the process and is referred to by the kernel at a detection of the abort signal by the detecting unit; and a storing unit configured to store the information obtained by the obtaining unit into a memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a schematic of exemplary signal sender information output.

DESCRIPTION OF EMBODIMENTS

Preferred embodiments of the present invention will be explained with reference to the accompanying drawings.

Figure 1:
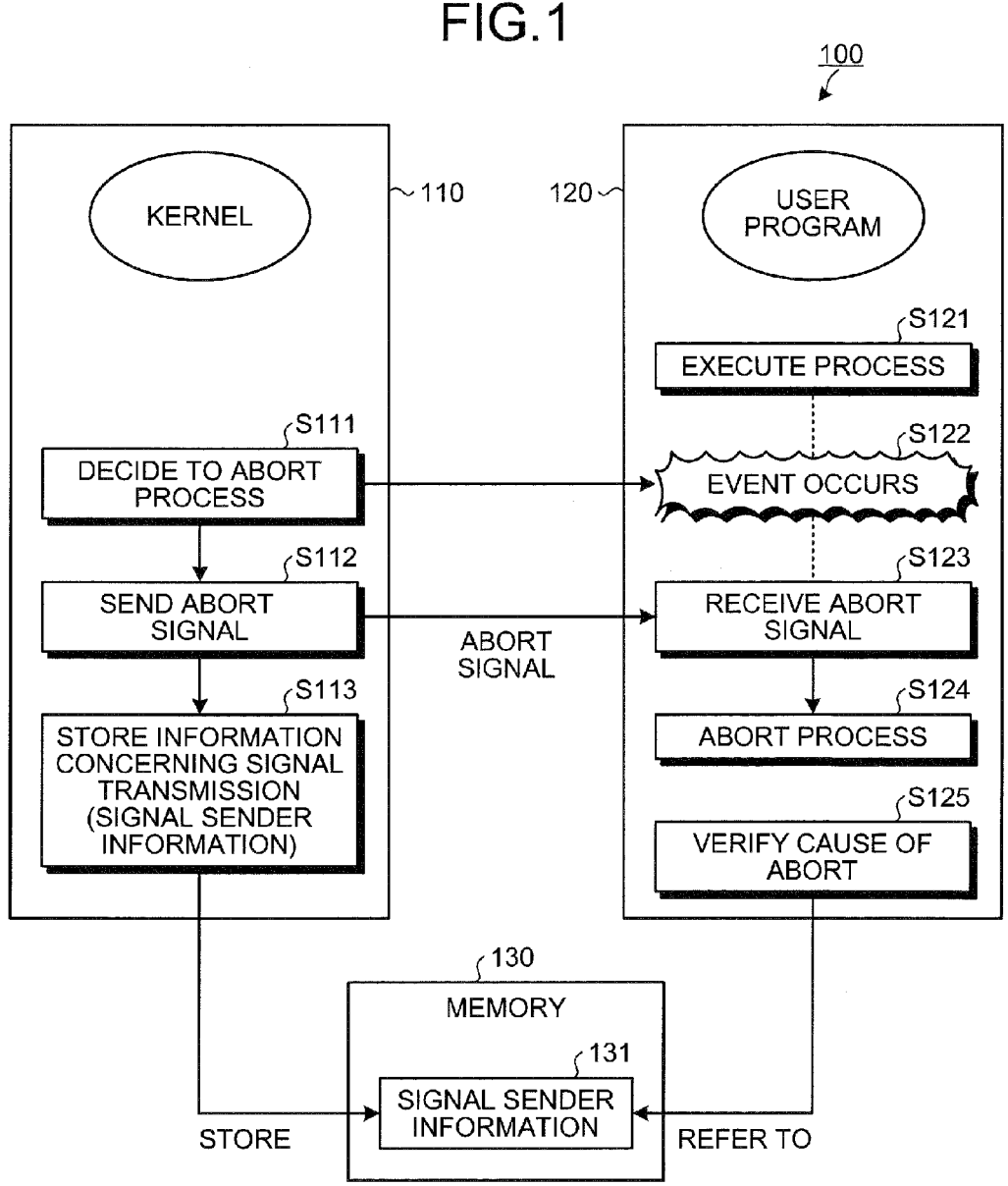
FIG. 1 is a schematic of an overview of process verification support according to the present embodiment.

FIG. 1 is a schematic of an overview of process verification support according to the present embodiment. FIG. 1 depicts an example of an execution of a process in an information processing apparatus 100. The information processing apparatus 100 is equipped with a kernel 110 as software functioning as an OS controlling the entire apparatus, thereby enabling a user to execute an application via the information processing apparatus 100. The kernel 110 controls the entire information processing apparatus 100, and causes the information processing apparatus 100 to execute an application specified by the user, herein, a "user program 120."

In FIG. 1, it is assumed that the execution of a process is initiated at the user program 120 (step S121), and during the execution, an event causing an abort occurs (step S122). The kernel 110 continuously monitors the process under execution by the user program 120 and thus, can detect the occurrence of an event during execution of the process (step S122).

A detection of an occurrence of an event (step S122) triggers the kernel 110 to decide to abort the process (step S111), and to send an abort signal to the user program 120 (step S112).

Upon receiving the abort signal from the kernel 110 (step S123), the user program 120 aborts the process under execution (step S124). Although the operations described above are similarly executed by conventional kernels 110 and user programs 120 for aborts, in the present embodiment, further operations are executed after the abort of the process to support the user in verifying a process that has caused the abort.

After sending the abort signal at step S112, the kernel 110 stores signal sender information 131 into a memory 130 for storing information concerning signal transmission (signal sender information) (step S113). If verification of the process causing the abort is initiated by the user after the abort, the user program 120 refers to the signal sender information 131 stored into the memory 130 (step S125).

As described above, according to the information processing apparatus 100 of the present embodiment, even if a process is aborted during execution due to the reception of an unexpected abort signal, details concerning the execution of the process can be verified by referring to the signal sender information 131 stored into the memory 130. Thus, the cause of the abort can be identified based on the result of the process verification.

A configuration of the information processing apparatus 100 enabling the identification of the cause of an abort, and operation thereof upon an abort, will be described.

Figure 2:
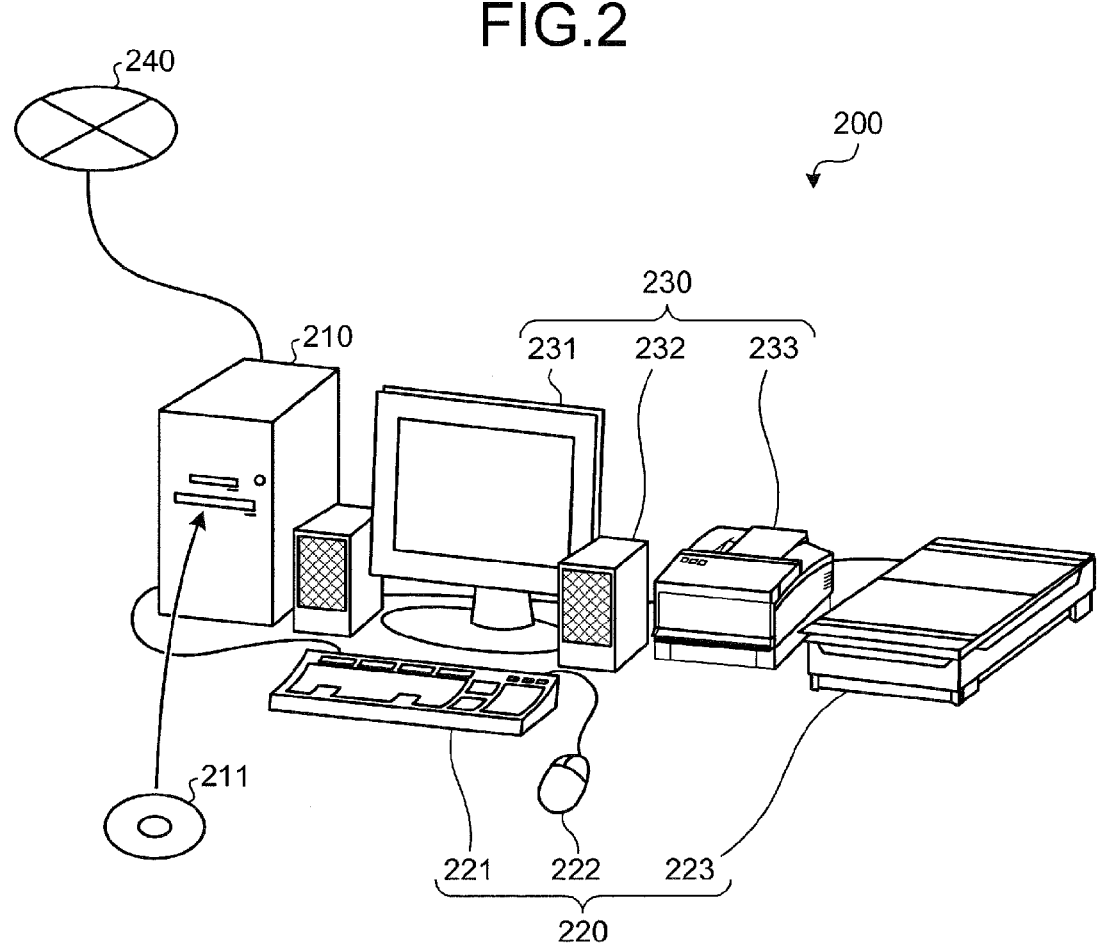
FIG. 2 is a diagram of a hardware configuration of the information processing apparatus according to the present embodiment.

FIG. 2 is a diagram of a hardware configuration of the information processing apparatus according to the present embodiment.

As depicted in FIG. 2, the information processing apparatus 200 includes a computer 210, input devices 220, and output devices 230, and may be connected to a network 240, such as a local area network (LAN), a wide area network (WAN), and the Internet through a non-depicted router or a modem.

The computer 210 has a central processing unit (CPU), a memory, and an interface. The CPU governs overall control of the information processing apparatus 200. The memory includes read-only memory (ROM), random access memory (RAM), a hard disk (HD), an optical disk 211, and flash memory. The memory is used as a work area of the CPU.

The memory stores therein various programs, such as kernels and applications that are loaded in response to a command from the CPU. The reading and the writing of data with respect to the HD and the optical disk 211 are controlled by a disk drive. The optical disk 211 and the flash memory are removable from the computer 210. The interface controls input from the input devices 220, output to the output devices 230, and transmission/reception with respect to the network 240.

A keyboard 221, a mouse 222, and a scanner 223 are adopted as the input devices 220. The keyboard 221 includes keys to input, for example, characters, numeric figures, and various kinds of instructions, and data is input through the keyboard 221. The keyboard 221 may be a touch panel. The mouse 222 is used to move a cursor, select a range, move a window, or change window size. The scanner 223 optically reads an image as image data, which is stored in the memory of the computer 210. The scanner 223 may have an optical character recognition (OCR) function.

A display 231, a speaker 232, a printer 233, etc. are adopted as the output devices 230. The display 231 displays a cursor, an icon, or a tool box as well as data, such as text, an image, and function information. The speaker 232 outputs sound, e.g., a sound effect or text-to-voice converted sound. The printer 233 prints image data or text data.

Figure 3:
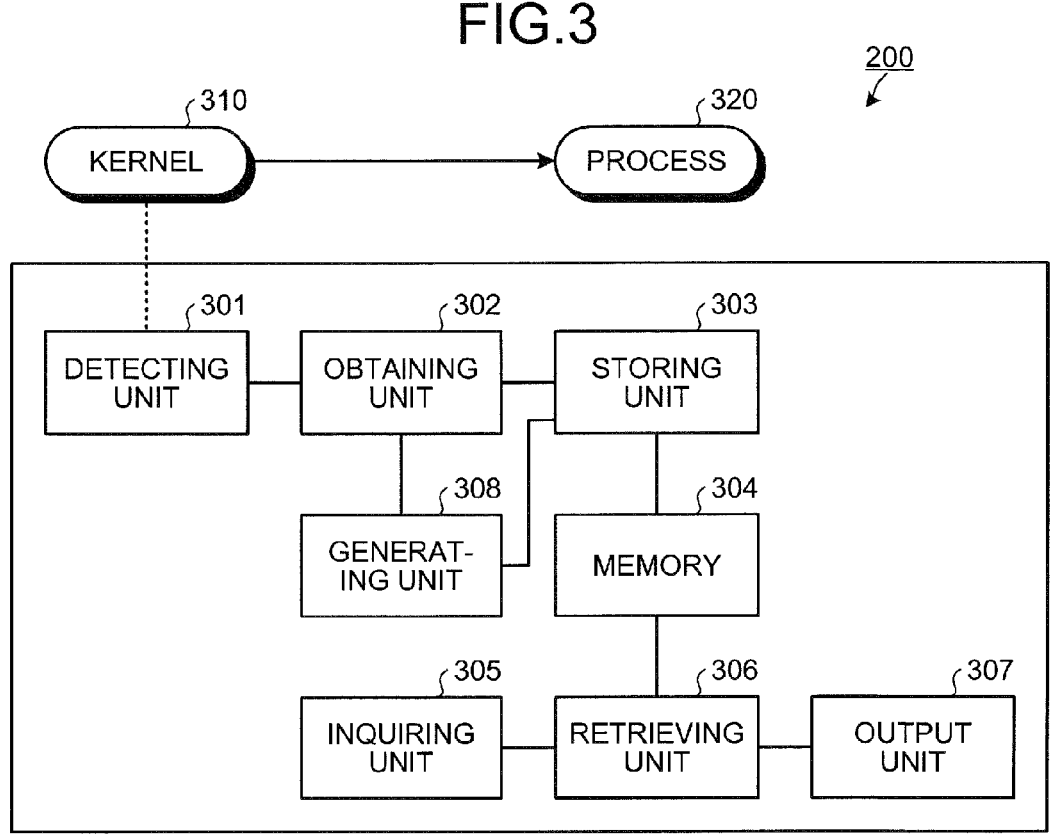
FIG. 3 is a block diagram of a functional configuration of the information processing apparatus for the process verification support.

FIG. 3 is a block diagram of a functional configuration of the information processing apparatus for the process verification support. As depicted in FIG. 3, the information processing apparatus 200 includes a detecting unit 301, an obtaining unit 302, a storing unit 303, a memory 304, an inquiring unit 305, a retrieving unit 306, an output unit 307, and a generating unit 308.

Each of the functions 301 to 308 may be included in a kernel 310 as an additional function thereof, or may be stored in the information processing apparatus 200 as an independent program and applied by the information processing apparatus 200 to software functioning as an OS. The functions can be implemented through an input and output I/F, and by causing the CPU to execute a program that is relevant to the functions 301 to 308 and stored in a storage device of the information processing apparatus 200.

The detecting unit 301 detects an abort signal among signals from the kernel 310 that monitors the execution of a process by referring to details concerning the execution.

The obtaining unit 302 obtains information that concerns the details of the execution of a process 320 under execution and that is referred to by the kernel 310 at the detection of the abort signal by the detecting unit 301. The obtained information on the details concerning the execution of the process 320 includes various types of information, such as the process number and the sender information. The obtaining unit 302 may obtain from the information on the details concerning the execution of the process 320, given information specified in advance. By limiting the type(s) of information to be obtained, the load to the memory 304 can be reduced and information necessary for process verification can be efficiently obtained.

The storing unit 303 stores the information obtained by the obtaining unit 302 into the memory 304 that utilizes the storage device of the information processing apparatus 200. The memory 304 may be a dedicated kernel memory that is generally provided in the storage device of the information processing apparatus 200 equipped with the kernel 310.

The inquiring unit 305 receives an inquiry on the aborted process. The inquiry may be received directly (via the input device 210 depicted in FIG. 2) from the user executing the process 320 by the information processing apparatus 200, or may be received from an application for verification of the aborted process executed by the information processing apparatus 200.

The retrieving unit 306 retrieves, from the memory 304, the information on the details concerning the execution of the process 320 for which the inquiry has been received by the inquiring unit 305.

The output unit 307 outputs the information retrieved by the retrieving unit 306. The output unit 307 may output the information stored in the memory 304 as it is, or may output the information after converting the information into a file of a given format. The output unit 307 may output the information retrieved by the retrieving unit 306 not only to the user of the information processing apparatus 200, but also to a given address specified by the user, when the inquiring unit 305 receives an inquiry on the aborted process 320.

When the abort signal is detected by the detecting unit 301, the generating unit 308 generates a core file that includes the content stored in a given storage area at the time of the detection. For example, a file of the name "core" and in which the content of a memory and/or a register is stored is generated. The generating unit 308 generates the core file inclusive of the information on the details concerning the execution of the process obtained by the obtaining unit 302.

The function of the generating unit 308 may be included in the kernel 310 in advance. In such a case, the generating unit 308 may revise the core file generated by the kernel 310 to include the details concerning the execution of the process.

Two embodiments of operation upon the occurrence of an abort will be described using an example in which an application that is executed by a user via the information processing apparatus 200 is aborted for some reason. A first embodiment describes an information processing apparatus 200 that does not include the generating unit 308 or the generating unit 308 thereof malfunctions and thus, no core file is generated. A second embodiment describes an information processing apparatus 200 that includes the generating unit 308 and thus, the core file is generated.

In the first embodiment, information concerning the sender of the abort signal is stored upon the occurrence of the abort, thereby enabling the executor of the aborted process to verify the process. A sender-side process of the information processing apparatus 200 for sending the abort signal, and a recipient-side process thereof that receives the abort signal and is aborted will be described below.

Figure 4:
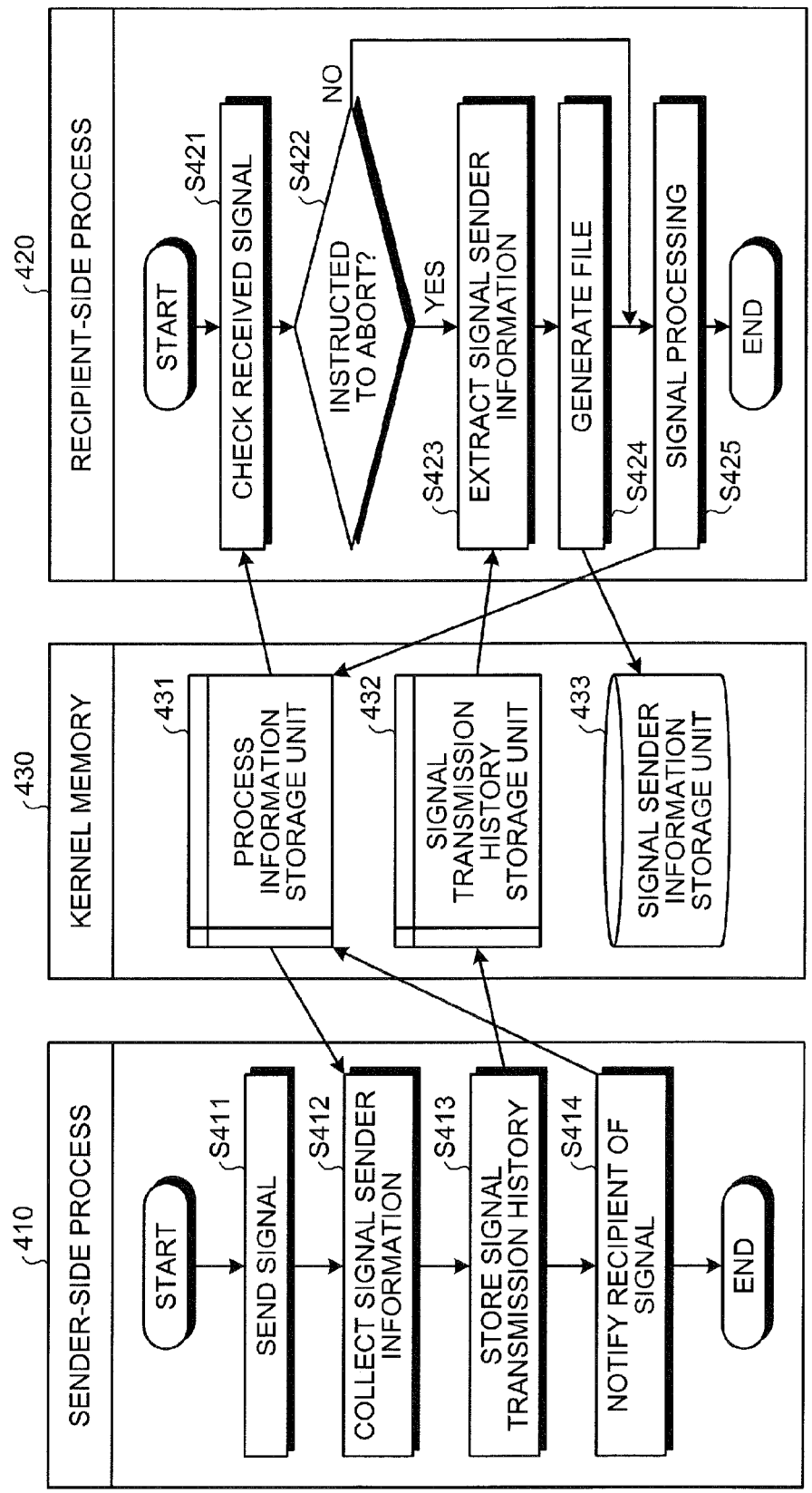
FIG. 4 is a flowchart of a procedure of process verification support according to a first embodiment.

FIG. 4 is a flowchart of a procedure of process verification support according to the first embodiment. A sender-side process 410 depicted in FIG. 4 is a flowchart of sending to a process under execution, a signal (for example, a signal "kill") instructing an abort. A recipient-side process 420 is a flowchart of receiving the abort instruction, and aborting the process under execution.

A kernel memory 430 includes, along with a conventional process information storage unit 431, a signal transmission history storage unit 432 and a signal sender information storage unit 433 since the present embodiment requires a procedure for storing information concerning the abort.

As depicted in FIG. 4, when an abort occurs, the sender-side process 410 transmits a signal (step S411) and collects signal sender information with respect to the signal (step S412).

Figure 5:
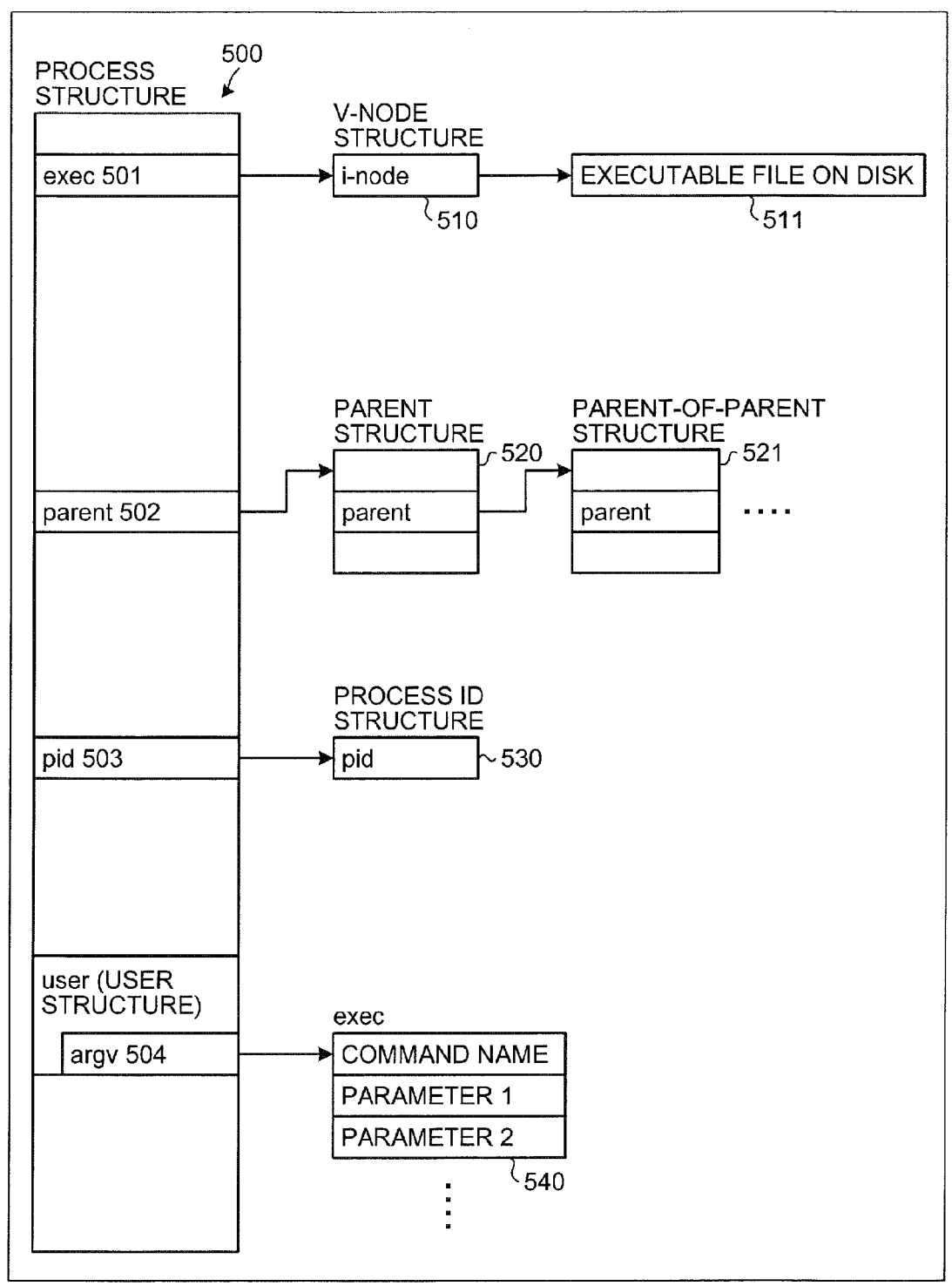
FIG. 5 is a schematic of a configuration of process information.

The sender-side process 410 also obtains from the process information storage unit 431, information concerning the signal transmission process. FIG. 5 is a schematic of a configuration of process information. As depicted in FIG. 5, the process information is stored in the process information storage unit 431 as a process structure 500.

The process structure 500 depicted in FIG. 5 includes: (1) exec 501 indicating a v-node structure; (2) parent 502 indicating a parent process structure; (3) pid 503 indicating a process ID structure; and (4) user 504 indicating a user structure, etc. From these structures, information for verifying the details concerning the execution of the process of the sender of the signal, at the time of the abort is obtained.

For example, from the exec 501, an i-node 510 indicating an i node and an executable file 511 on the disk are obtained. From the parent 502, a parent included in a parent process structure 520 and a parent-of-parent (i.e., grandfather) process structure 521 can be obtained. From the pid 503, a pid 530 indicating the identity of the sender (e.g., a character string indicating the sender ID, etc.) is obtained. From the user 504, an exec 540 is obtained as the content of the signal sent by the sender. The exec 540 includes a command name (e.g., "kill") and parameters.

As step S412 of the sender-side process 410, a transmission time, stack information, the type of signal, and information concerning the identity of the recipient are obtained from the sender-side process 410 itself as the signal transmission history.

The time of transmission is obtained from a time of day (TOD) that is included in the information processing apparatus 200 and holds the number of seconds from Jan. 1, 1970. The obtained information can be converted into the form of year-month-day.

Figure 6:
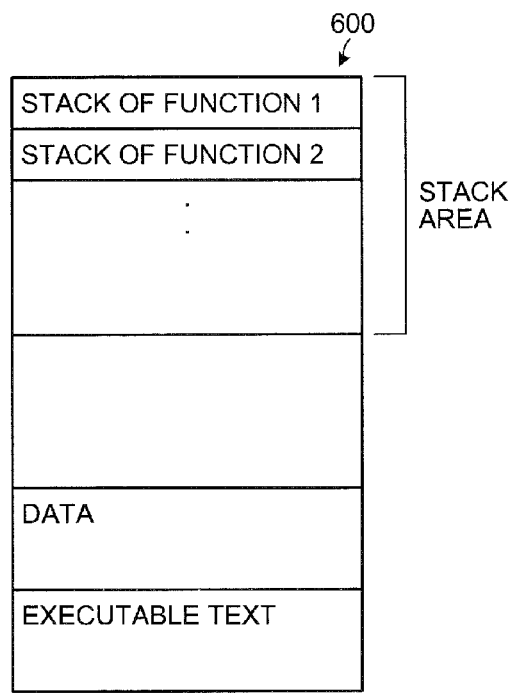
FIG. 6 is a chart of an exemplary configuration of virtual memory space.

The stack information is placed at a given location in a virtual memory space of the user process itself. FIG. 6 is a chart of an exemplary configuration of the virtual memory space. As depicted in FIG. 6, stack information is stored in the address space 600 for each call of a function, and includes an address (i.e., which command on the memory is executed) and parameters.

As described above, information is obtained from the process information storage unit 431 and the sender-side process 410 itself as the signal sender information (step S412), and is stored into the signal transmission history storage unit 432 (at step S413).

Figure 7:
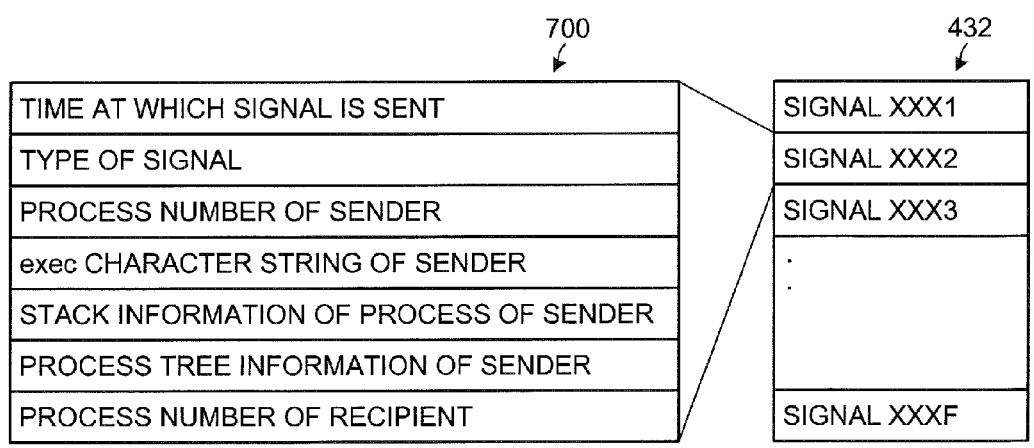
FIG. 7 is a schematic of a configuration of a signal transmission history storage unit.

FIG. 7 is a schematic of a configuration of the signal transmission history storage unit. The signal sender information (e.g., signals XXX1 to XXXF) obtained from the signal information is cyclically stored into the signal transmission history storage unit 432 depicted in FIG. 7.

The signal sender information is configured as depicted in a table 700. For example, the signal sender information is configured by data for obtaining information (e.g., the data below) to verify which process is executed in the recipient-side process 420 when the signal is sent.

Transmission time: verified based on TOD (elapsed time from start of the system)

Type of signal: verified based on the signal number

Identity of sender: verified based on the PID and the exec character string. The PID is the process number of the process that has sent the signal, and the exec character string is a character string that includes "command name+option," such as "kill 29999."

State at the time of transmission: verified based on the stack information and the process tree information. The stack information, which corresponds to the output of pstack command of UNIX, includes "address of function+name of function+parameters+offset in function" and is used for checking the flow of the process that has sent the signal. The process tree information, which corresponds to the output of ptree command of UNIX, includes the process number and a character string indicating "command name+option" and is used for checking the parent process and higher process(es) of the process that has sent the signal Identity of the recipient: verified based on the process number of the process that receives the PID signal The reference of the description returns to FIG. 4, after storing the signal transmission history that includes the sender information described above, the sender-side process 410 notifies the recipient of the signal (step S414), and the operations end. The notification at step S414 is also stored into the process information storage unit 431 as a part of the sender-side process 410.

The recipient-side process 420 refers to the process information storage unit 431 and checks the received signal (step S421) to determine whether an instruction for abort has been received (step S422). If an instruction for abort has been received (step S422: YES), the recipient-side process 420 retrieves from the signal transmission history 432, the signal sender information corresponding to the signal checked at step S421 (step S423).

Using the signal sender information extracted at step S423, the recipient-side process 420 generates a file of a given format that is easy to use for the user (step S424). The generated file is stored into the signal sender information storage unit 433 to be referred to during process verification. The recipient-side process 420 executes signal processing (step S425), and the operations end. Needless to say, the processing at step S425 is also stored into the process information storage unit 431 as a part of the recipient-side process 420.

FIG. 8 is a schematic of exemplary signal sender information output. Text data 800 depicted in FIG. 8 is an example of the file generated at step S424, and the signal sender information is output as a text that can be verified by the user. Components of the text data 800 have the following meanings.

Time: time of transmission
Signal: Type of signal (signal number)
Sender: Identity of sender (PID)
Command: Identity of sender (exec character string)
Stack Trace: State at time of transmission (stack information)
Process Tree: State at time of transmission (process tree information)
Receiver: Identity of recipient (PID)

For example, "Command" executes Kill command to a process 18904, and "—ABRT" designates the signal number 6. "Stack Trace" indicates that functions "start( )" "main( )" . . . and "kill( )" are called in this order. "Process Tree" indicates that a process 217 starts a process 18070 that starts a process 18080, and csh (like DOS prompt) of the process 18080 executes the kill command.

As described above, in the first embodiment, the signal sender information is obtained and stored when a process under execution is aborted. Further, the signal sender information necessary for process verification is stored as a file of a given format that is easy to use for the user, thereby enabling the user to refer to necessary information immediately.

As described above, the second embodiment describes process verification support when an abort signal is detected at an information processing apparatus 200 capable of generating the core file.

Figure 9:
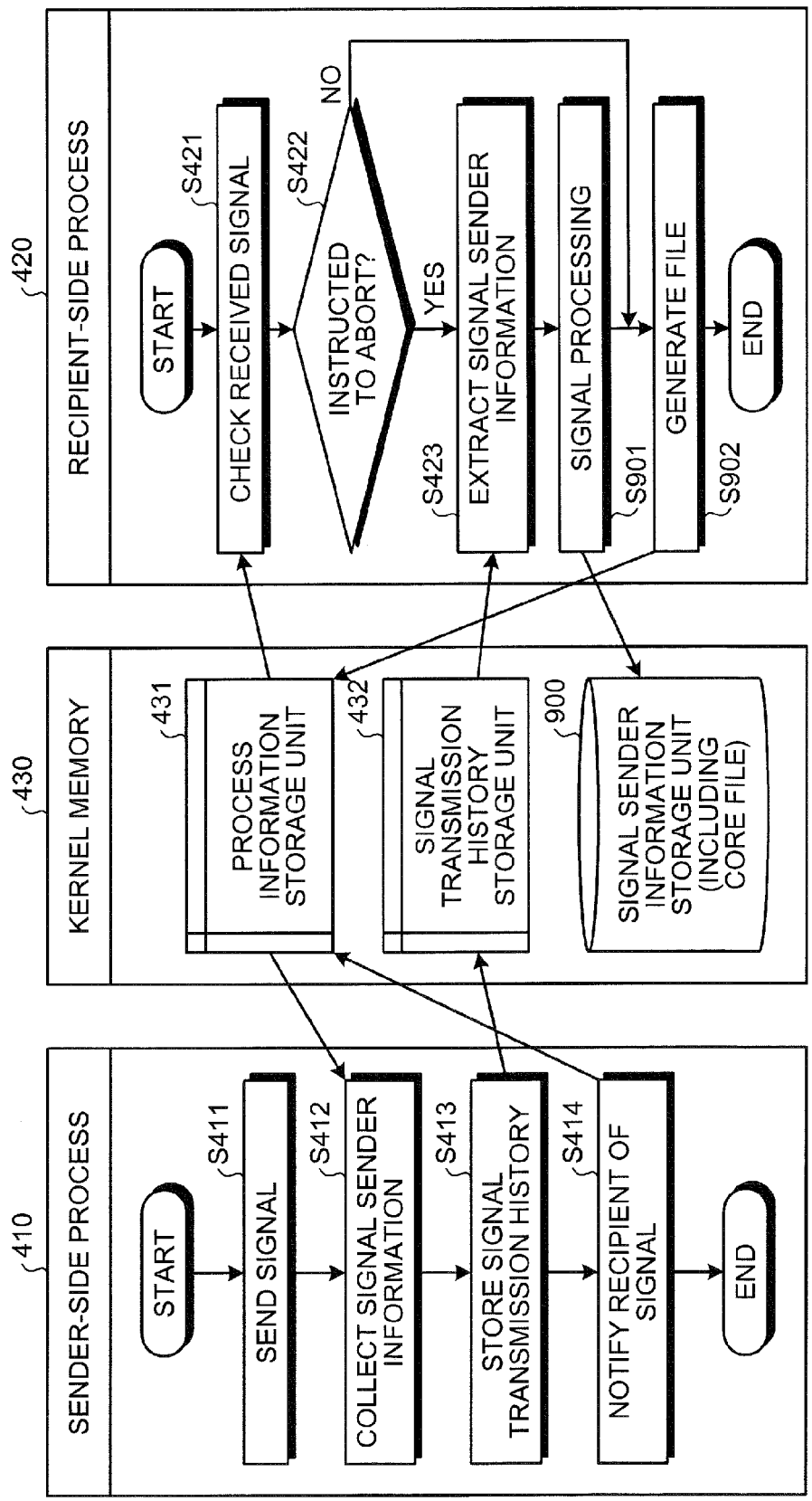
FIG. 9 is a flowchart of a procedure of process verification support according to a second embodiment.
Figure 10:
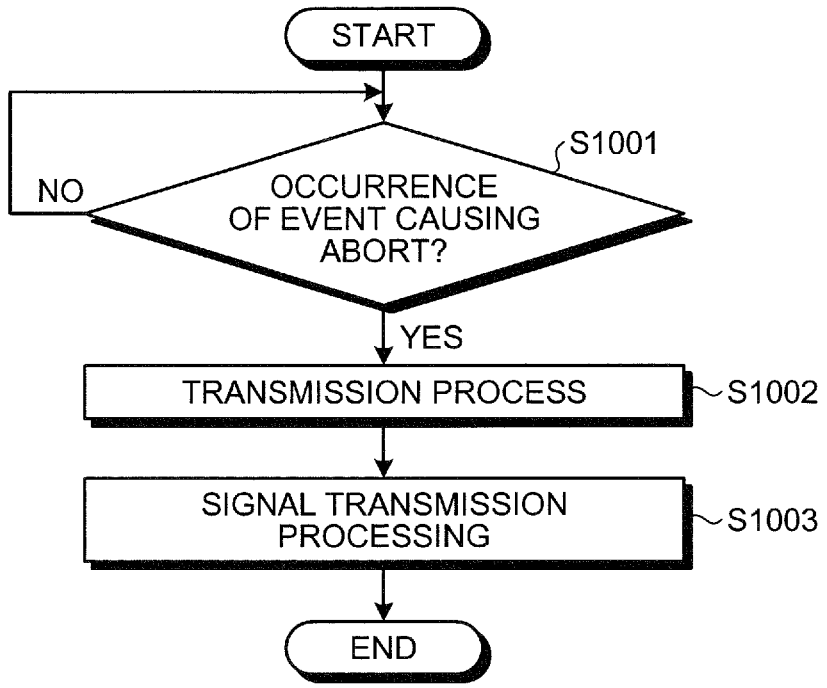
FIG. 10 is a flowchart of an abort signal transmission process executed by a kernel.
Figure 11:
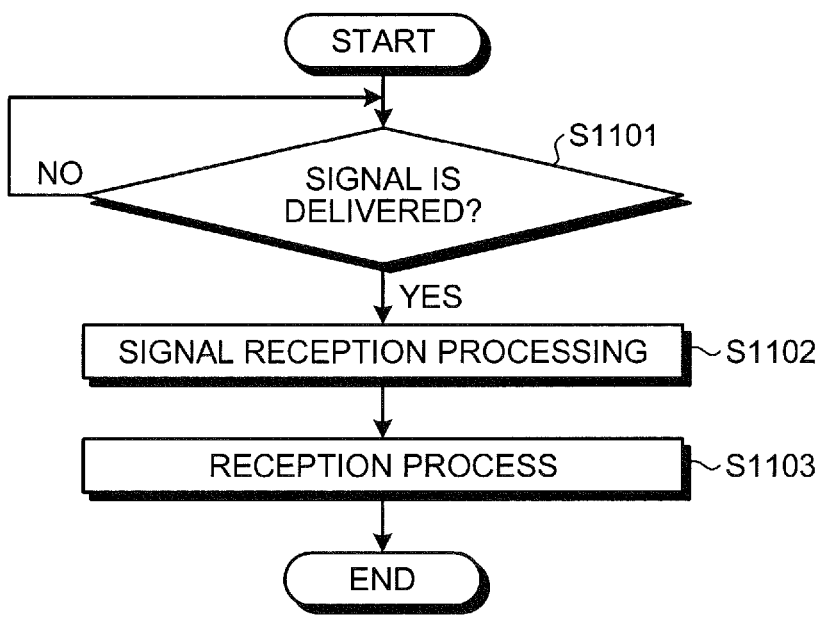
FIG. 11 is a flowchart of an abort signal reception process executed by an application.

FIG. 9 is a flowchart of a procedure of process verification support according to the second embodiment. Compared to FIG. 4, the procedure of the recipient-side process 420 depicted in FIG. 9 is partially changed, and in a kernel memory 930, the signal sender information storage unit 433 is replaced with a signal sender information storage unit 900 having the core file. Other operations are similar to those of the first embodiment and thus, description thereof is omitted.

In the second embodiment, if aborted, the recipient-side process 420 executes the signal processing (step S901); generates, from the signal sender information (step S902), a file of a given format that is easy to use for the user; incorporates the file into the core file; and stores the core file into the signal sender information storage unit 900.

As described above, the signal sender information is incorporated into a conventional core file if a core file is generated when a process is aborted, thereby enabling the user to verify the process based on both information included in the conventional core file and the signal sender information.

As described above, according to the present embodiment, information on the details concerning the execution of the process referred by the kernel at the time of the detection of the abort signal from the kernel is obtained and stored into the memory. The stored information is information on the details concerning the execution of the process causing the output of the abort signal by kernel. Thus, information stored in the memory enables process verification and identification of the cause of the abort.

The process verification support method described in the present embodiment may be implemented by executing a prepared program on a computer such as a personal computer and a workstation. The program is stored on a (tangible) computer-readable recording medium such as a hard disk, a flexible disk, a CD-ROM, an MO, and a DVD, read out from the recording medium, and executed by the computer. The program may be a transmission medium that can be distributed through a network such as the Internet.

The information processing apparatus 200 described in the present embodiment can be implemented by an application specific integrated circuit (ASIC) such as a standard cell or a structured ASIC, or a programmable logic device (PLD) such as a field-programmable gate array (FPGA). Specifically, for example, functional units (detecting unit 301 to output unit 307) of the information processing apparatus 200 are defined in hardware description language (HDL), which is logically synthesized and applied to the ASIC, the PLD, etc., thereby enabling manufacture of the information processing apparatus 200.

According to the embodiments, when an abort occurs, the cause can be efficiently identified irrespective of the skill of the user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a detecting unit configured to detect an abort signal among signals from a kernel that monitors execution of a process by referring to details concerning the execution;
an obtaining unit configured to obtain information that concerns the details concerning the execution of the process and is referred to by the kernel at a detection of the abort signal by the detecting unit; and
a storing unit configured to store the information obtained by the obtaining unit into a memory,
wherein the information includes an identity of a sender of the abort signal and information on a state of the process at the time of transmission.

2. The information processing apparatus according to claim 1, further comprising:
an inquiring unit configured to receive an inquiry on an aborted process;
a retrieving unit configured to retrieve, from the memory, the information on the details concerning the execution of the process for which the inquiry has been received by the inquiring unit; and
an output unit configured to output the information retrieved by the retrieving unit.

3. The information processing apparatus according to claim 2, wherein the output unit outputs the information stored to the memory after converting the information into a file of a given format.

4. The information processing apparatus according to claim 2, wherein the output unit outputs the information retrieved by the retrieving unit to a given address, when the inquiring unit receives the inquiry on the aborted process.

5. The information processing apparatus according to claim 1, further comprising a generating unit configured to generate, when the abort signal is detected by the detecting unit, a core file that includes content stored to a given storage area at the time of the detection,
wherein the core file includes the information on the details concerning the execution of the process and is obtained by the obtaining unit.

6. The information processing apparatus according to claim 1, wherein the obtaining unit obtains information specified in advance, from the information that concerns the details concerning the execution of the process, and is referred to by the kernel at the detection of the abort signal.

7. A process verification method of verifying in a computer, details concerning execution of a process aborted by a kernel that is equipped in the computer and that monitors execution of the process by referring to the details concerning the execution, the method comprising:
detecting an abort signal;
obtaining information that concerns the details and that is referred to by the kernel at a detection of the abort signal at the detecting; and
storing, into a memory, the information obtained at the obtaining,
wherein the information includes an identity of a sender of the abort signal and information on a state of the process at the time of transmission.

8. The process verification method according to claim 7, further comprising:
receiving an inquiry on the process aborted;
retrieving, from the memory, the information on the details concerning the execution of the process for which the inquiry has been received at the receiving; and
outputting the information retrieved at the retrieving.

9. The process verification method according to claim 8, wherein the outputting includes outputting the information stored to the memory after converting the information into a file of a given format.

10. The process verification method according to claim 8, wherein the outputting includes outputting the information retrieved at the retrieving to a given address, when the inquiry on the aborted process is received at the receiving.

11. The process verification method according to claim 7, further comprising generating, when the abort signal is detected at the detecting, a core file that includes content stored to a given storage area at the time of the detection, wherein the core file includes the information on the details concerning the execution of the process and is obtained at the obtaining.

12. The process verification method according to claim 7, wherein the obtaining includes obtaining information specified in advance, from the information that concerns the details and that is referred to by the kernel at the detection of the abort signal.

13. A tangible, computer-readable recording medium storing therein a process verification program for verifying in a computer, details concerning execution of a process aborted by a kernel that is equipped in the computer and that monitors execution of the process by referring to the details concerning the execution, the stored program causing a computer to execute:
detecting an abort signal among signals from the kernel;
obtaining information that concerns the details and that is referred to by the kernel at a detection of the abort signal at the detecting; and
storing, into a memory, the information obtained at the obtaining,
wherein the information includes an identity of a sender of the abort signal and information on a state of the process at the time of transmission.

14. The tangible, recording medium according to claim 13, the stored program further causing the computer to execute:
receiving an inquiry on the process aborted;
retrieving, from the memory, the information on the details concerning the execution of the process for which the inquiry has been received at the receiving; and
outputting the information retrieved at the retrieving.

15. The tangible, recording medium according to claim 14, wherein the outputting includes outputting the information stored to the memory after converting the information into a file of a given format.

16. The tangible, recording medium according to claim 14, wherein the outputting includes outputting the information retrieved at the retrieving to a given address, when the inquiry on the aborted process is received at the receiving.

17. The tangible recording medium according to claim 13, the stored program further causing the computer to execute generating, when the abort signal is detected at the detecting, a core file that includes content stored to a given storage area at the time of the detection, wherein the core file includes the information on the details concerning the execution of the process and is obtained at the obtaining.

18. The tangible, recording medium according to claim 13, wherein the obtaining includes obtaining information specified in advance, from the information that concerns the details and that is referred to by the kernel at the detection of the abort signal.

* * * * *